(12) United States Patent
Huang

(10) Patent No.: US 12,704,964 B2
(45) Date of Patent: Aug. 11, 2026

(54) FLASH TRANSLATION LAYER WRITE PATH ARCHITECTURE FOR INCREASED THROUGHPUT

(71) Applicant: Micron Technology, Inc., Boise, ID (US)

(72) Inventor: Ying Huang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 12 days.

(21) Appl. No.: 18/814,822

(22) Filed: Aug. 26, 2024

(65) Prior Publication Data

US 2026/0056661 A1 Feb. 26, 2026

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

2011/0145475 A1* 6/2011 Eleftheriou ......... G06F 12/0246 711/170
2016/0098355 A1* 4/2016 Gorobets ............ G06F 12/0246 711/203
2016/0170870 A1* 6/2016 Camp ................ G06F 12/0246 711/103
2020/0225851 A1* 7/2020 Klein .................. G06F 11/1012
2020/0409845 A1* 12/2020 Lee ......................... G06F 12/10
2022/0050758 A1* 2/2022 Sheperek .............. G06F 11/076
2022/0156002 A1* 5/2022 Kim ........................ G06F 3/061
2023/0028627 A1* 1/2023 Bhardwaj ............. G06F 3/0679
2023/0360682 A1* 11/2023 Yang .................... G11C 7/1096
2025/0004940 A1* 1/2025 Gururaj ............... G06F 12/0891
2025/0110665 A1* 4/2025 Clarke .................. G06F 3/0604

* cited by examiner

*Primary Examiner* — Janice M. Girouard
(74) *Attorney, Agent, or Firm* — Lowenstein Sandler LLP

(57) ABSTRACT

A processing device includes flash translation layer logic to be coupled to a memory device and that includes cursor logic to generate a criteria set associated with generating a backend command to be sent the memory device and streamer logic to access and employ the criteria set, e.g., aggregates translation units (TUs) received in one or more write messages. The criteria set enables accessing the plurality of TUs within a first format, of the one or more write messages, that depends on a data path associated with the one or more write messages. The streamer logic formats the aggregated TUs into the backend command having a second format for transmittal to the memory device. The backend command is to direct the memory device in writing TU data, associated with the TUs, to a memory array of the memory device.

20 Claims, 8 Drawing Sheets

Figure 2:
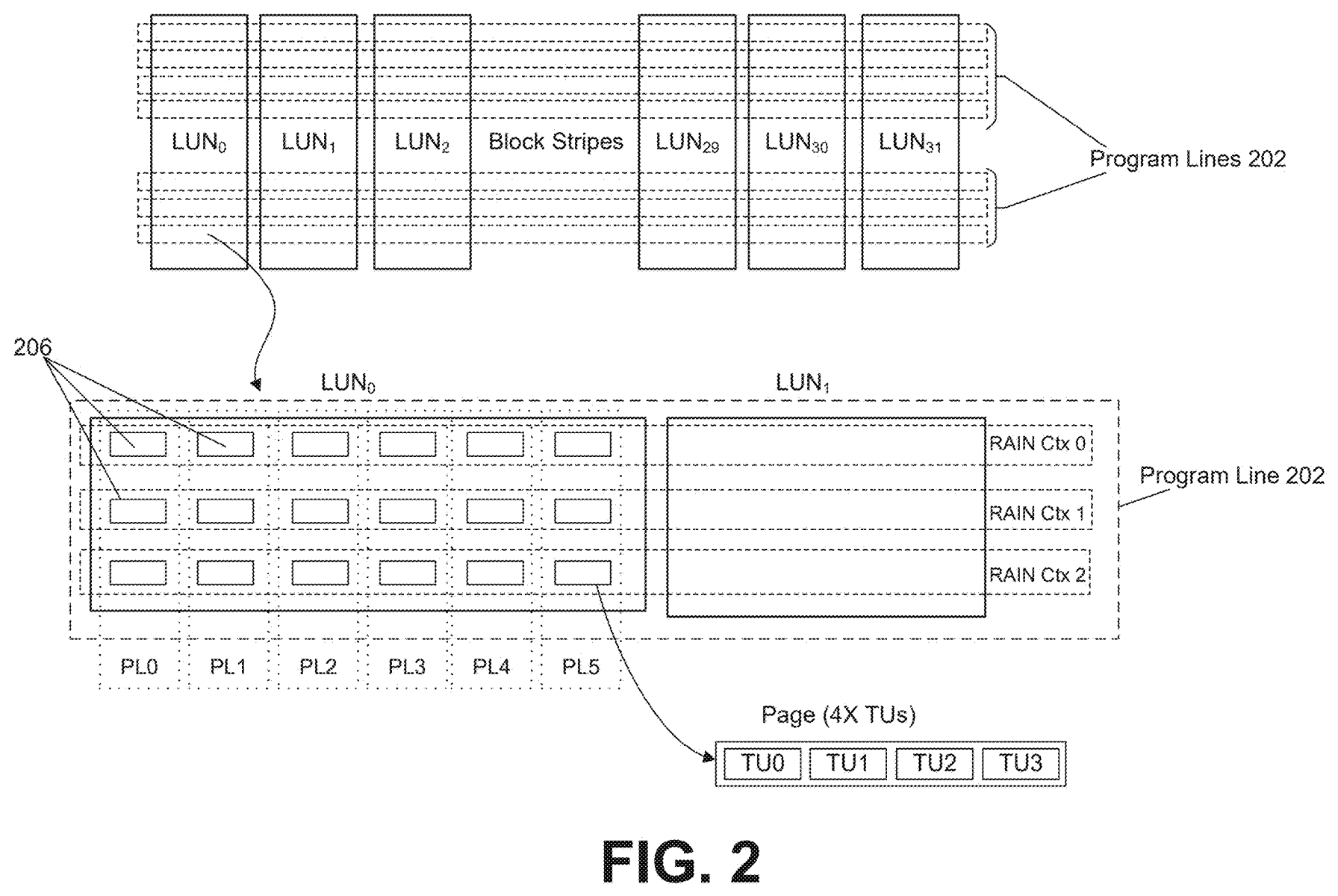

Program Lines 202

$LUN_0$ $LUN_1$ $LUN_2$ Block Stripes $LUN_{29}$ $LUN_{30}$ $LUN_{31}$

Program Line 202

$LUN_0$ $LUN_1$

RAIN Ctx 0
RAIN Ctx 1
RAIN Ctx 2

PL0 PL1 PL2 PL3 PL4 PL5

206

Page (4X TUs)

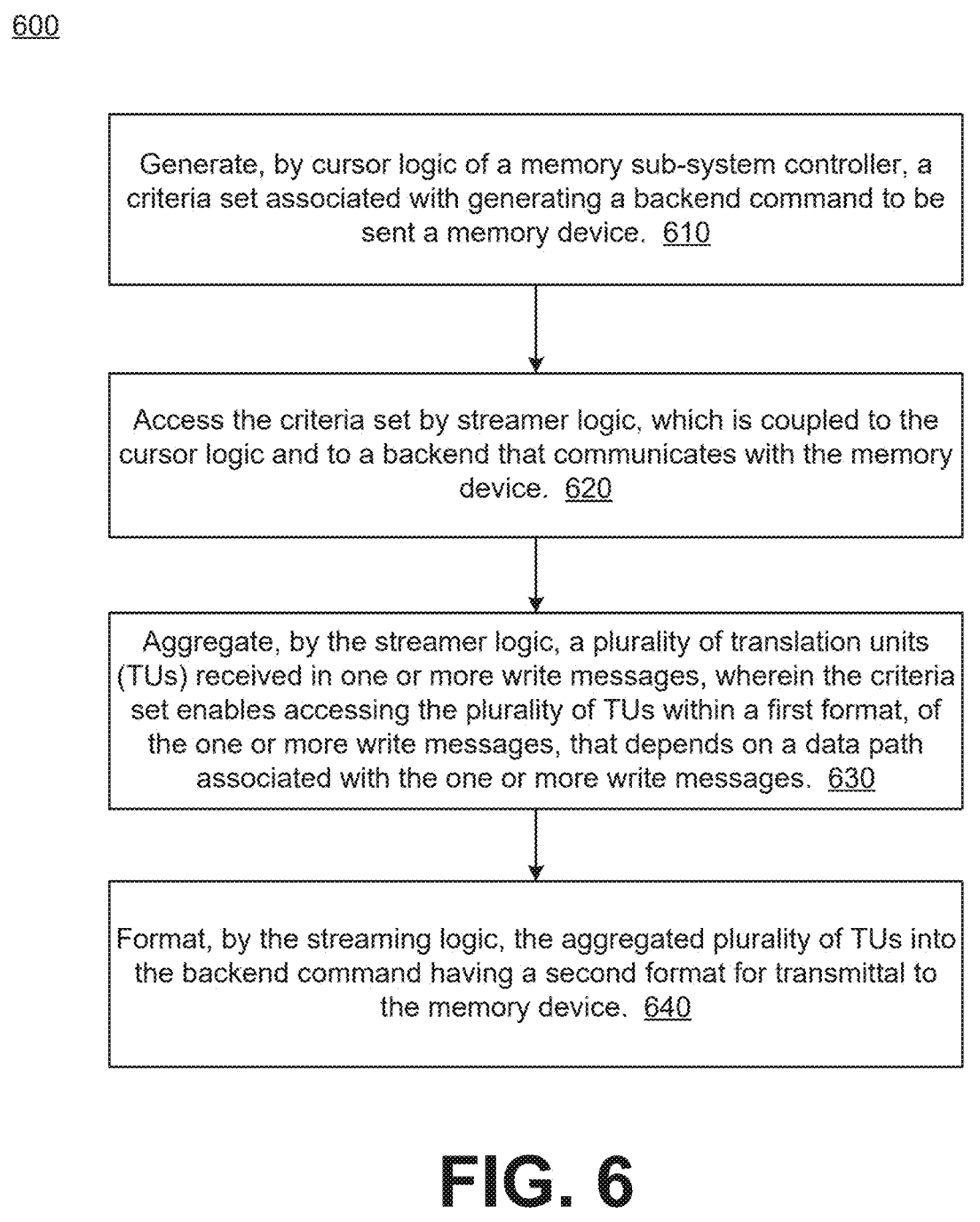

Generate, by cursor logic of a memory sub-system controller, a criteria set associated with generating a backend command to be sent a memory device. 610

Access the criteria set by streamer logic, which is coupled to the cursor logic and to a backend that communicates with the memory device. 620

Aggregate, by the streamer logic, a plurality of translation units (TUs) received in one or more write messages, wherein the criteria set enables accessing the plurality of TUs within a first format, of the one or more write messages, that depends on a data path associated with the one or more write messages. 630

Format, by the streaming logic, the aggregated plurality of TUs into the backend command having a second format for transmittal to the memory device. 640

FIG. 6

FLASH TRANSLATION LAYER WRITE PATH ARCHITECTURE FOR INCREASED THROUGHPUT

TECHNICAL FIELD

Embodiments of the disclosure relate generally to memory sub-systems, and more specifically, to a flash translation layer write path architecture for increased throughput.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a block diagram depiction of a write sequencer arrangement of multiple dies and block stripes according to various embodiments.

FIG. 6 is a flow diagram of an example method of synergistic interaction between cursor logic and streamer logic for backend command generation in accordance with some embodiments.

DETAILED DESCRIPTION

Figure 1:
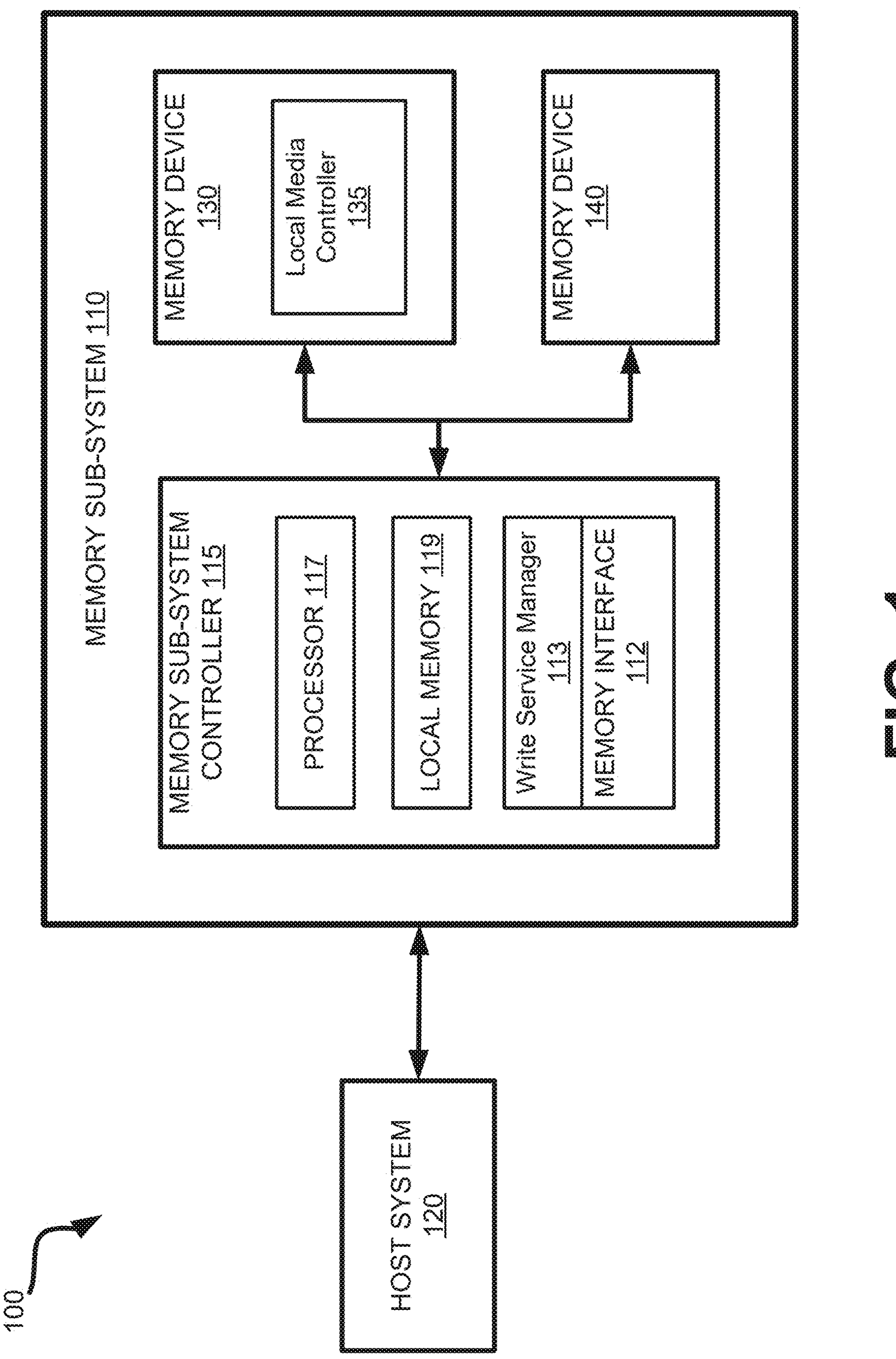
FIG. 1 illustrates an example computing system that includes a memory sub-system in accordance with some embodiments.

Aspects of the present disclosure are directed to a flash translation layer write path architecture for increased throughput according to some embodiments. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and request data to be retrieved from the memory sub-system.

A memory sub-system can include high-density, non-volatile memory devices where retention of data is desired when no power is supplied to the memory device. For example, NAND memory, such as 3D flash NAND memory, offers storage in the form of compact, high-density configurations. A non-volatile memory device is a package of one or more memory dies, each including one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A data block hereinafter refers to a unit of the memory device used to store data and can include a group of memory cells, a wordline group, a wordline, or individual memory cells. When data is written to NAND memory, the data can be written in block stripes that define program lines that are arrayed across different planes of multiple dies of a NAND memory device. In this way, more data can be written at the same time to the memory device due to being spread out across multiple planes and dies.

A flash translation layer (FTL) logic can be employed by a memory sub-system controller (e.g., processing device or "controller") that sits between the host file system and the NAND flash memory. This FTL logic emulates a traditional block storage device, such as a solid state drive (SSD), allowing the host file system to interact with the NAND memory without needing to know the details of the underlying hardware of the NAND memory. A mapping management module of the FTL logic can be employed to maintain a mapping table (or other data structure) that translates logical block addresses (LBAs) from the host into physical block addresses (PBAs) in the NAND memory. This mapping can change based on new host writes that cause re-written logical block address (LBA) to be mapped to a different NAND location. Other functions that the FTL performs can include, for example, wear leveling, garage collection, bad block management, error correction, and data management.

The FTL logic can generate backend commands directing the NAND memory to perform write, read, and erase operations, although the present disclosure will be more specifically focused on write commands (generated from write requests) that trigger write operations at the NAND memory, e.g., the memory storage device discussed herein. These backend commands can include significant information, including pointers to data to be written as well as address information for a range of addresses where the data is to be sequentially written to the memory device. The data can be arranged as a group of translation units (TUs) in some cases. A TU can be understood as a group of blocks that the FTL logic manages as a single entity for the purposes of logical-to-physical (L2P) address translation and other operations. The FTL can, for example, manage the mapping of TUs, ensuring that each TU from the host corresponds to the correct physical units in the memory device. The FTL can also make sure the placement of TUs on the NAND following a write, and to enhance performance, maintains wear leveling and efficient garbage collection. The FTL can also maintain the integrity of the TUs during read, write, and erase operations, ensuring that data remains consistent and accurate.

In certain sub-system memory controllers, the FTL logic includes a cursor module that receives a number of write messages (or requests), processes each write message in turn to identify the TUs involved with each write message, and combines the TUs into a backend command. This cursor module, however, for performance reasons, typically also performs optimization that is specific to a particular data path in which, for example, host commands might be treated differently than internally-generated writes that are FTL-specific. For example, internal FTL-specific write commands from the controller can vary widely depending on the FTL component doing the writing, which will be discussed in more detail.

As the number of TUs that are being combined increases (e.g., corresponding to increases in NAND memory size), the size of the backend command increases, causing the cursor module to have to work more, which impacts performance. The workload of the cursor module can be increased when the write messages arrive in different formats, and generates rather complex internal states, which makes asynchronous power loss (APL) and clean power down (CPD) flows for persisting and restoring data more difficult and time consuming. The memory consumption of the cursor module is also quite large. Further, as the cursor module cannot starve other modules running on the same controller, the cursor module can constantly yield to other processes before it can continue, e.g., by way of switches. When the cursor module yields to another module, the cursor module has to later resume in a serial fashion by handling the next write message to be aggregated until the correct number of TUs are aggregated for the backend command. This causes delays due to the inefficient management approach to backend command generation.

Aspects of the present disclosure address the above and other deficiencies by splitting out, from the cursor module, a streamer logic that specializes in processing the write messages and generating the backend commands depending on the context of generation of the backend command. This leaves a cursor logic (from the cursor module) adapted to generate a criteria set associated with generating the backend command and that makes the criteria set available to the streamer logic, among performing other functions. In this way, different streamer logic components can be pre-designed (or pre-programmed) to specialize to a particular data path and be more streamlined to handle particular types of write commands. Further, the disclosed FTL architecture enables decoupling cursor operations from write command operations. Once a given streamer logic accesses the criteria set generated for the streamer logic by the cursor logic, the streamer logic can efficiently perform certain operations until the backend command is generated and sent to the backend, which interfaces with and sends a corresponding write command to the memory device.

For example, in some embodiments, a processing device (e.g., controller) includes flash translation layer (FTL) logic to be coupled to a memory device. The FTL logic can include cursor logic to generate a criteria set associated with generating a backend command to be sent the memory device. The FTL logic can include streamer logic coupled between the cursor logic and a backend that interfaces with the memory device. The streamer logic can access and employ the criteria set to aggregate a plurality of TUs received in one or more write messages. The criteria set can enable the streamer logic to access the plurality of TUs within a first format, of the one or more write messages, that depends on a data path associated with the one or more write messages. The criteria set can further enable the streamer logic to format the aggregated plurality of TUs into the backend command having a second format for transmittal to the memory device via the backend. In embodiments, the backend command directs the memory device in writing TU data, associated with the plurality of TUs, to a memory array of the memory device.

In an alternative embodiments, a system includes a memory device with a memory array located across a plurality of planes. A processing device is coupled to the memory device and includes flash translation layer (FTL) logic. The FTL logic can include first cursor logic to allocate storing data to a first block stripe across the plurality of planes and generate a first criteria set associated with generating a first backend command to be sent the memory device. The FTL logic can include second cursor logic to allocate storing data to a second block stripe across the plurality of planes and generate a second criteria set associated with generating a second backend command to be sent the memory device. The FTL logic can further include streamer logic coupled between the first and second cursor logic and a backend that interfaces with the memory device. In embodiments, the streamer logic switches between accessing and employing one of the first criteria set or the second criteria set to generate the first backend command or the second backend command, respectively, based on an identity of incoming write messages to be processed.

Advantages of the present disclosure include offloading TU aggregation and backend command generation to a specialized streamer logic, which can be adapted to a particular data path. In this way, multiple streamer logic modules can be designed or programmed that are streamlined to handle certain types of formatting in incoming write messages and able to generate, from those types of write messages, a correctly formatted backend command. This leaves cursor logic with only having to perform the more generic and data-path independent operations that result in the criteria set useable by each different streamer logic module. The throughput of ever-increasingly large backend commands can be increased due to this streamlined specialization between cursor logic and streamer logic. By way of further advantages, the present approach reduces redundant operations by handling all-good-plane dies (e.g., LUNs) differently that dies having some bad blocks or planes. The present approach also allow the cursor and the streamer to be designed and optimized differently. Further, the present approach can provide better support for cursor state persisting and restoring of data associated with APL/CPD flows. For example, the present approach includes more sophisticated support than simple data storage for persist and adds support for post-persist cursor state recovery. These and other advantages will be apparent based on the additional details provided herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, the memory sub-system 110 includes a memory interface component 112. Memory interface component 112 is responsible for handling interactions of memory sub-system controller 115 with the memory devices of memory sub-system 110, such as memory device 130. For example, memory interface component 112 can send memory access commands corresponding to requests received from host system 120 to memory device 130, such as program commands, read commands, or other commands. In addition, memory interface component 112 can receive data from memory device 130, such as data retrieved in response to a read command or a confirmation that a program command was successfully performed. In embodiments, the memory interface component 112 includes at least the backend (444 in FIG. 4A) referred to below. In some embodiments, the memory sub-system controller 115 includes at least a portion of the memory interface 112. For example, the memory sub-system controller 115 can include a processor 117 (processing device) configured to execute instructions stored in local memory 119 for performing the operations described herein. In some embodiments, the memory interface component 112 is part of the host system 110, an application, or an operating system.

In some embodiments, the memory sub-system controller 115 includes a memory write service manager 113 that can also be combined, at least in part, with the memory interface component 112. The memory write service manager 113 can include FTL logic that includes the cursor logic and streamer logic discussed herein. For example, the cursor logic can be designed to specialize in generating a criteria set. The streamer logic can be designed to specialize in employing the criteria set to aggregate TUs from incoming write messages and generate, from the aggregated TUs, a backend command. In some embodiments, the streamer logic transmits the backend command to the memory interface component 112 for transmission to the memory device 130. The backend command can direct the memory device 130 in writing TU data, associated with the plurality of TUs, to a memory array of the memory device.

In various embodiments, the memory sub-system controller 115 includes at least a portion of the write service manager 113 and is configured to perform the functionality described herein, particularly in relation to generating backend commands. In such embodiments, at least portions of the write service manager 113 can be implemented using hardware or as firmware, stored on in the local memory 119 and/or in the memory device 130, executed by the write service manager 113 to perform the operations described herein. In some embodiments, one or more operations performed by the write service manager 113 are performed by the local media controller 135 or other logic located on-board the memory device 130.

FIG. 2 is a block diagram depiction of a write sequencer arrangement of multiple dies and block stripes according to various embodiments. As illustrated, a number of program lines 202 can be arranged corresponding to block stripes, which is a method of organizing and accessing data across multiple blocks (e.g., super blocks) across multiple dies (e.g., $LUN_0$ to $LUN_{31}$) to improve performance and reliability. This type of organization is similar to the striping technique used in Redundant Array of Independent NAND (RAIN) systems, where data is distributed across multiple disks to achieve parallelism and redundancy. Both block striping and RAIN-based striping are envisioned and will be referred to herein.

In an embodiment, the bottom, inset portion of the block diagram is a zoomed-in view of two adjacent dies (e.g., $LUN_0$ and $LUN_1$) of a single program line 202 that is intersected by multiple planes (e.g., PL0 through PL5). At the intersection of RAIN context lines of the program line 202 and the multiple planes are multiple pages 206. As an example, each page of the multiple pages 206 includes space for data of four TUs.

In some embodiments, only by way of example, each program line 202 across a die (or LUN) can be 72 times 4,000 bytes of data (e.g., 288 KB), which would go into a single backend command. The write sequences would need to sequence the data with a smallest footprint as fast as possible, which motivates the solutions of the present disclosure because backend commands are getting larger. Also, each program line 202 may have different numbers of pages at different planes depending on the memory type. For example, memory configured as single-level cell (SLC) memory would have one page while memory configured as multi-level cell (MLC) memory would have multiple pages. The MLC memory could be bi-level cell, triple-level cell (TLC), or quad-level (QLC), or higher-level cell memory. Thus, for MLC type memory, the physical-to-logical address translation can include multiple pages across planes of several dies. The cursor logic would need to know when to close out one write command (e.g., backend write command) and start aggregation of write messages for the next write command, which depends on memory type.

Figure 3:
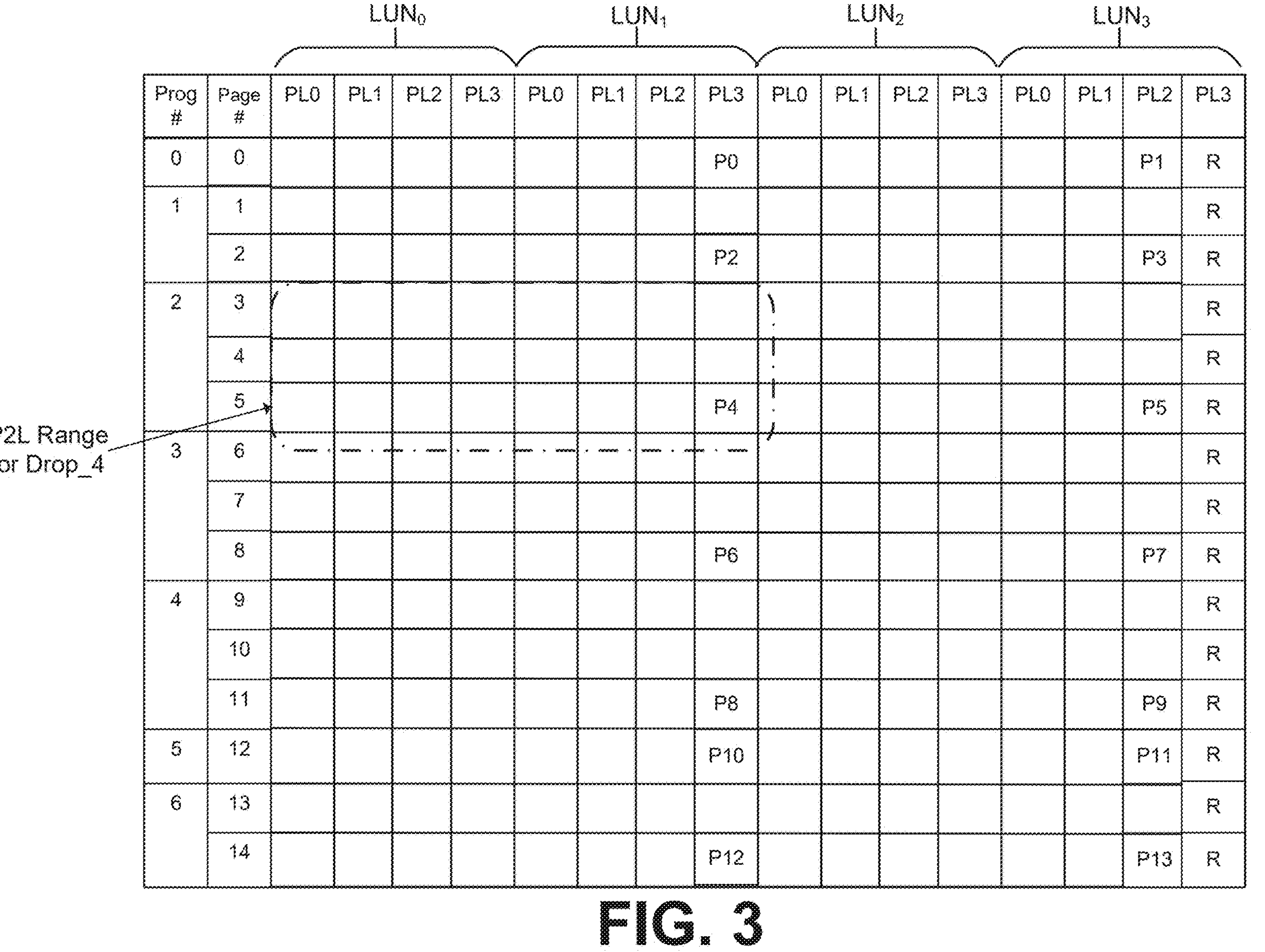
FIG. 3 is a graph depiction of a write sequencer arrangement of multiple dies and an example logical-to-physical (P2L) address range across planes of the multiple dies that might make up different write commands according to various embodiments.

FIG. 3 is a graph depiction of a write sequencer arrangement of multiple dies and an example logical-to-physical (P2L) address range across planes of the multiple dies that might make up different write commands according to various embodiments. Only by way of example, the top of the graph indicates that four dies ($LUN_0$ through $LUN_3$) are each organized into four planes. The left-most column organizes program lines and the next column from there indicates page number. Only by way of example, physical-to-logic (P2L) address range for Drop 4 is illustrated spanning across pages 3, 4, and 5, and the planes of $LUN_0$ and $LUN_1$. The term "Drop" here connotes that a particular write command needs to be generated, e.g., as a backend command, due to a TU buffer being full. When this TU buffer is full, then the write data is "dropped" from the TU buffer, e.g., written, to the memory device at the specified location of the P2L address range specified in the criteria set received from the cursor logic.

In some embodiments, the page/plane intersections (e.g., blocks) with P numbers (e.g., P0, P1, P2, P3, and so forth) are reserved for P2L drop metadata (e.g., metadata describing the aggregated TUs stored in the rest of the Drop area). For example, the TUs written to the area described by Drop 4 in FIG. 3 can include other useful information such as for performing FTL data management, e.g., as garbage collection and wear leveling. In some embodiments, the P2L drop metadata facilitates reverse lookup to find where the data maps to in NAND, e.g., TUA1000 maps to which NAND address. In embodiments, the FTL logic may need to perform a reverse address lookup before folding data into a new block stripe.

With additional specificity, TU addresses (TUAs) are logical address used by the host system 120 to specify TU data. When the host system 120 wants to write TU data, the host system 120 commands the FTL logic what TUA the TU should be associated with, and the FTL logic can write this data to the memory device 130 at a specific NAND location, e.g., a physical address. At this time, a section of metadata is added to the TU data as part of a NAND write command, which can begin as a backend command. When writing to the location is completed, the mapping from TUA to the physical NAND address can be written to a L2P table or other data structure. When the host system 120 attempts to read the TU data, in some embodiments, the host system 120 sends the TUA as part of a read command, performs an FTL logic query of the L2P table to determine the NAND physical address, and sends a backend read command to read the actual TU data out of the location of the memory device 130. In embodiments, the TUA is stored as part of metadata (as part of NAND write earlier), which can be read out to check if the TU read actual matches TUA asked by the host system 120, e.g., by way of a read error check.

In some embodiments, the last column of the four dies is plane three (PL3), which is also the last block of a corresponding program line and page number. The "R" in each of these last page/plane intersections (e.g., blocks) is for writing the RAIN parity data useable to restore lost data in the event of data corruption.

Figure 4A:
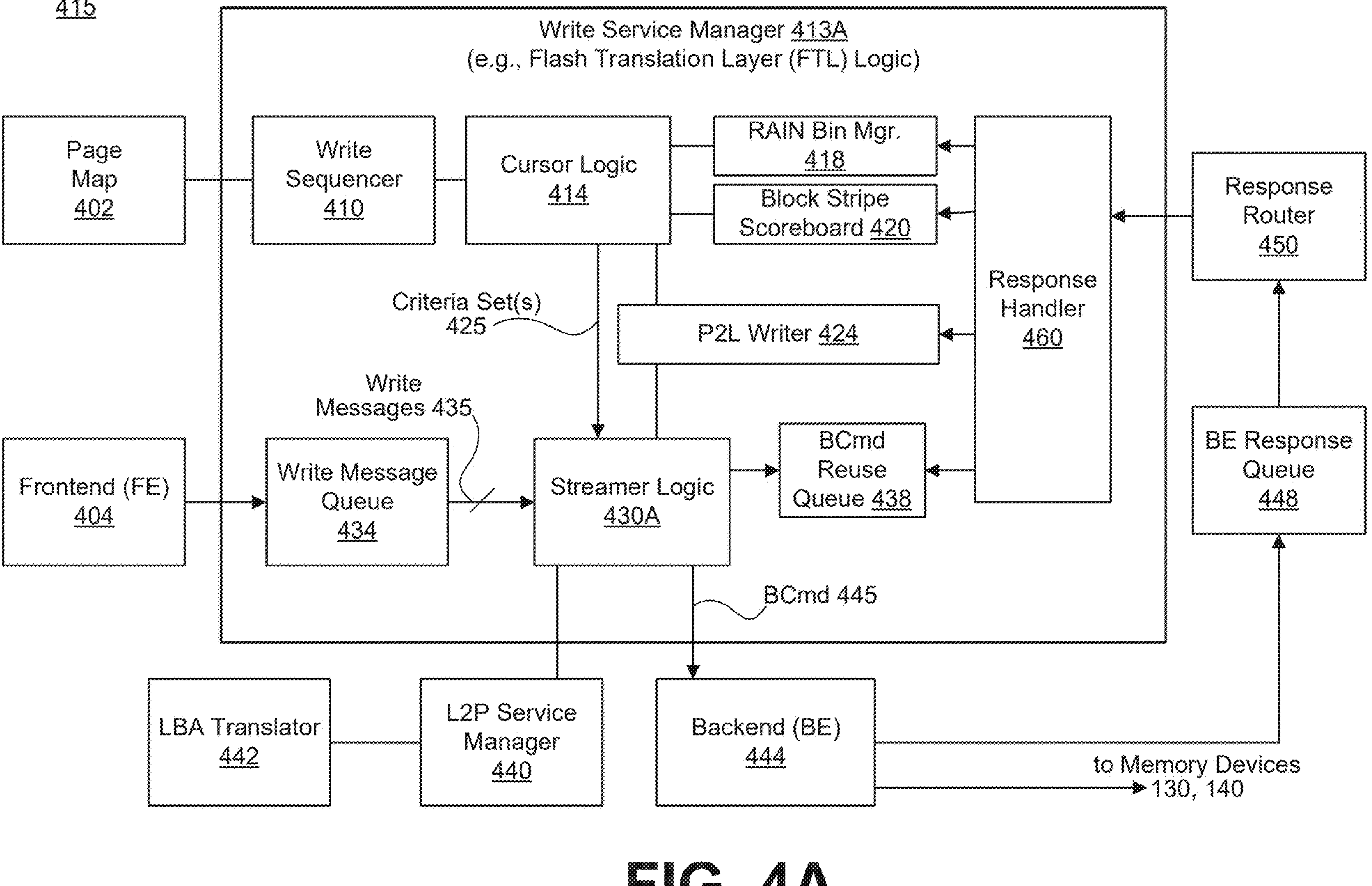
FIG. 4A is an example sub-system controller that includes a write service manager and other supporting components for backend command generation and related P2L tracking according to some embodiments.

FIG. 4A is an example sub-system controller 415 that includes a write service manager 413 and other supporting components for backend command generation and related P2L tracking according to some embodiments. In such embodiments, the controller 415 is the memory sub-system controller 115 of FIG. 1. The controller 415 can include a page map 402, a front end 404, a write service manager 413, an LBA translator 442, an L2P service manager 440, a backend 444, a backend response queue 448, and a response router 450. In at least some embodiments, the write server manager 413 includes different FTL components, including at least a write sequencer 410, cursor logic 414, a RAIN bin manager 418, a block stripe scoreboard 420, a P2L writer 424, streamer logic 430A, a write message queue 434, a backend command (BCmd) reuse queue 438, and a response handler 460.

In some embodiments, the page map 402 is stored in the local memory 119 and includes information about the NAND page layout of a block, for example, by specifying how many pages exists in a NAND block, what pages should be grouped together as a programming line, and at what order the pages should be programmed. For this reason, the information in the page map 402 is NAND type specific in nature. The write sequencer 410 can employ the page map 402 to build the page/plane mapping depiction of FIG. 3, enabling tracking of groupings of write locations in the memory device 130 according to page number, program line, planes, and dies. In embodiments, the cursor logic 414 can access the write sequencer 410, as well as the RAIN bin manager 418, the block stripe scoreboard 420, and P2L writer 424 in order to perform various functionalities that will be described. In embodiments, the cursor logic 414 determines when the end of a program line is reached (see FIG. 2) and a new program line is to be started. The cursor logic 414 can also determine whether there are certain planes that need to be skipped due to bad planes.

The stripping techniques of RAIN and block stripes was previously introduced and are known techniques to achieve parallelism and redundancy, which enhance programming efficiency. In embodiments, the RAIN bin manager 418 stores and tracks RAIN context information used to maintain integrity, redundancy, and efficient operation of the memory sub-system 110, including performance optimizations. This RAIN context information (e.g., "contexts") can include metadata such as block/page statuses, redundancy information such as parity data and RAIN level configuration. In embodiments, the block stripe scoreboard 420 tracks the progress of writes on the block stripe to which is being programmed.

In at least some embodiments, the cursor logic 414 generates a criteria set 425 (e.g., a type of write command recipe) associated with generating a backend command 445 (or BCmd), by the streamer logic 430A, to be sent to the memory device 130. For example, the backend command 445 can be a write command that directs the memory device 130 in writing TU data, associated with the plurality of TUs, to a memory array of the memory device 130. In different embodiments, the cursor logic 414 is either dedicated hardware or a processing core. In some embodiments, the cursor logic 414 stores the criteria set 425 in a memory such as the local memory 119 and/or the memory device 140. The cursor logic 414 can then provide, to the streamer logic 430A, a pointer to the memory where the criteria set 425 is stored, e.g., so that the streamer logic 430A can access the criteria set in the memory.

In some embodiments, the criteria set 425 includes a location in the memory array where a write command should be performed in response to the backend command 445 and how the TU data is to be organized for being written to the location in the memory device 140. In embodiments, the criteria set 425 further includes at least two of the following: a size of a page group including an aggregated plurality of TUs, a number of valid buffers for the page group, P2L translation-specific information, a first bitmask for bad planes of the memory device 140, a second bitmask for parity planes of the memory device, RAIN-related information, and a flash logical address of the backend command 445. This type of information enables the streamer logic 430A to understand how many aggregated TUs are expected for each backend command 445 and how to formulate the LBA range to be programmed based on a present cursor state and available locations in the memory array, e.g., as illustrate in FIG. 3.

In some embodiments, the cursor logic further opens and closes a block stripe across a plurality of planes of the memory device 140, allocates and track RAIN contexts of the memory device 140, interacts with the write sequencer 410 to layout how write operations are to be ordered, interacts with a physical-to-logical (P2L) write unit (e.g., the P2L writer 424) to open and close P2L buffers, and handles RAIN parity writes. The cursor write logic 414 can further direct the streamer logic 430A, e.g., via the criteria set 425, save and restore cursor states for power cycles (which will be discussed in more detail), and can direct moving data from one location to another with the memory device 130 or 140.

In embodiments, the streamer logic 430A is coupled between the cursor logic 414 and the backend 444 that interfaces with the memory devices 130 and 140. In different embodiments, the streamer logic 430A is hardware, a special pattern of data to be processed, software, firmware, or a combination thereof. The streamer logic 430A can thus access and employ the criteria set 425 (e.g., write command recipe) to perform various FTL operations. For example, if the criteria set 425 was stored in the memory (such as the local memory 119 or the memory device 140), the streamer logic 430A can access the location in memory associated with the pointer received from the cursor logic 414 to access and use the criteria set 425. In embodiments, the streamer logic 430A aggregates, according to the criteria set, a plurality of TUs received in one or more write messages 435, e.g., from the write message queue 434. The write message queue 434 can buffer write messages 435 received from different components of the frontend 404 as well as from FTL components of write service manager 413. In embodiments, the criteria set 425 enables accessing the plurality of TUs within a first format, of the one or more write messages 435, that depends on a data path associated with the one or more write messages 435. In some embodiments, the streamer logic formats the aggregated plurality of TUs into the backend command 445 (BCmd) having a second format for transmittal to the memory device 140 via the backend 444.

In some embodiments, the data path varies and thus, multiple write service managers 413 can exist to include multiple streamer logic components, each configured for or adapted to a different data path. As such, the streamer logic 430A, as illustrated, is an exemplary streamer logic component of many possible streamer logic components. In such embodiments, the data path is one of a host data path (e.g., handling writes from the host system 120), a folding write data path (e.g., handling write requests for moving data from one block stripe to another to reclaim free space, which can be performed as part of garbage collection), a flash data manager (FDM) data path (e.g., handling write messages coming from the write service manager 413 or other FTL components), a post-persist physical-to-logical drop recovery data path (e.g., handling flushing and recovery of in-flight data at APL/CPD), or a unit test write data path (e.g., handling write messages associated with test write commands).

In embodiments, the streamer logic 430A interacts with the write message queue 434 to retrieve TU data buffer addresses and TU address information in order to aggregate the plurality of TUs. The streamer logic 430A can also update entries in a physical-to-logical (P2L) buffer associated with the TU address (or TUA) information. When the P2L mapping is reversed, the streamer logic 430A can store a mapping from a flash logical address (FLA) to a TUA. The streamer logic 430A can also transmit the backend command 445 to the memory device 130 or 140.

In embodiments, the streamer logic 430A enables reuse of entries within a backend command buffer (not illustrated) for subsequent write commands. For example, the backend command buffer can be reserved in the local memory 119 or the memory device 140 and can be limited to a certain number of backend command entries. By reusing the backend command entry that is already buffered for the next backend command 445, the streamer logic 430A can avoid releasing the backend command entry and reallocating the buffer entry all over again for the new backend command. The streamer logic 430A can further enable reuse of a pool of pre-allocated backend commands in generating the backend command 445. In some embodiments, the BCmd reuse queue 438 is located in the local memory 119 or the memory device 140 to include the backend command buffer, which is available to the streamer logic 430A.

In embodiments, the functionality of the streamer logic 430A can be optimized for all-good-plane LUNs (e.g., dies). For example, generating the backend command 445 can be sped up for a LUN that has no bad planes and for which RAIN and P2L drop locations are known. This can be due to fact that the streamer logic 430A has information from the criteria set 425, may know everything related to target locations for the write (e.g., bad planes, RAIN context, P2L drops), and can efficiently avoid memory locations to which the controller 415 should not write.

In various embodiments, responses from the memory device 130 (which can include statuses of progress of completing a write operation corresponding to a backend command) can be received at the backend response queue 448. In such embodiments, the response router 450 can process responses from the memory device 130 and decide whether to forward the responses to an error handling service (not illustrated) or the response handler 460 if not related to error messages. The response handler 460 can then perform updates, depending on the type of information in the response, to one or more of the RAIN bin manager 418, the block stripe scoreboard 420, the P2L writer 424, or the BCmd reuse queue 438. As just one example, the criteria set 425 stored by the cursor logic 414 for a particular backend command 445 can include a field used to track the last aggregation location targeted by the streamer logic 430A and another field used to track the remaining space for writing, e.g., slots pending to be aggregated with user TUs. Feedback in responses from the memory device 140 can include such information, e.g., the last aggregation location and available slots for further TU aggregation, which the cursor logic 414 can update in either or both of the RAIN bin manager 418 and block stripe scoreboard 420.

Figure 4B:
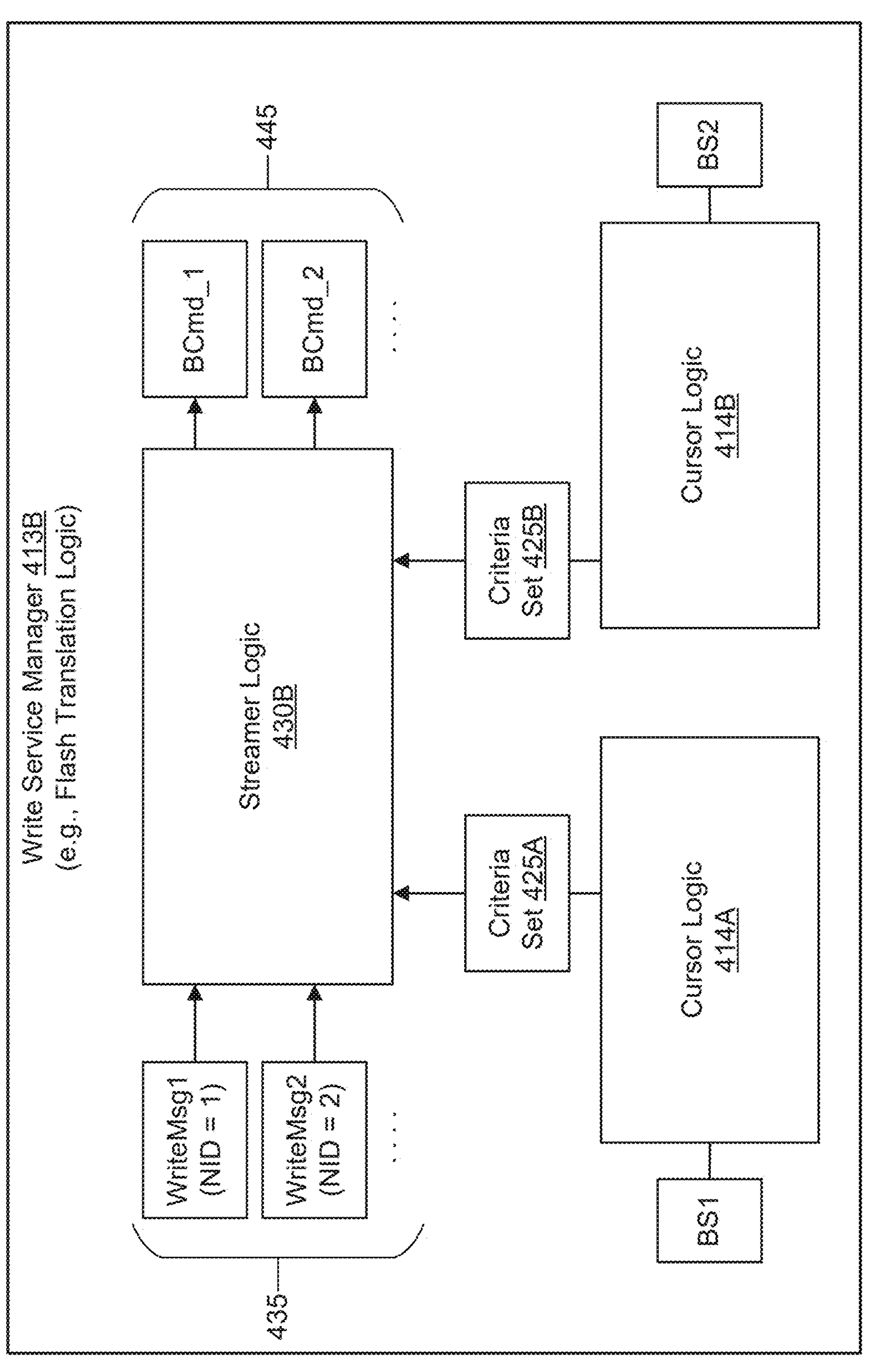
FIG. 4B is an example write service manager according to at least one multi-cursor embodiment.

FIG. 4B is an example write service manager 413B according to at least one multi-cursor embodiment. For example, the write server manager 413A of FIG. 4A can be enhanced with the duplicate components of the write service manager 413B of FIG. 4B in some embodiments. This multi-cursor embodiment can be employed, for example, when wanting to write to multiple block stripes at the same time. In doing so, the write service manager 413B can simultaneously handle multiple criteria sets for different data paths, for example. The multi-cursor embodiment can further facilitate optimization of folding data, e.g., by writing data in a way that can be overwritten in the same block stripe.

In such embodiments, the write service manager 413B includes first cursor logic 414A to allocate storing data to a first block stripe (BS1) across the plurality of planes and generate a first criteria set 425A associated with generating a first backend command (BCmd_1) to be sent the memory device 140. In embodiments, the write service manager 413B includes second cursor logic 414B to allocate storing data to a second block stripe (BS2) across the plurality of planes and generate a second criteria set 425B associated with generating a second backend command (BCmd_2) to be sent the memory device 140. In embodiments, the write service manager 413B includes streamer logic 430B coupled between the first and second cursor logic 414A and 414B and the backend 444 that interfaces with the memory device 130 or 140, as illustrated in FIG. 4A. In embodiments, the streamer logic 430B switches between accessing and employing the first criteria set or the second criteria set to generate the first backend command or the second backend command, respectively, based on an identity of incoming write messages to be processed.

For example, the streamer logic 430B can inspect incoming write messages 435, determine a namespace identifier (NID) associated with each write message 435, and then access (e.g., in the local memory 119 or the memory device 140) a criteria set corresponding to that particular NID in order to continue aggregating the write messages into generation of a corresponding backend command 445. In some embodiments, write messages with different NIDs are formatted differently, e.g., according to a particular data path architecture. As the streamer logic 430B detects different NIDs in the write messages 435, the streamer logic 430B can switch between criteria sets in order to work towards generating the proper type of backend command for different data paths, for example. In this way, the streamer logic 430B can be generally configured or designed but specifically implemented depending on a specific criteria set.

More specifically, according to one embodiment, the streamer logic 430B determines one or more write messages 435, received from a host interface (HIF), which include a first namespace identifier (ID) associated with the first block stripe (BS1). The streamer logic 430B can further access the first criteria set 425A at a first location in memory. The streamer logic 430B can aggregate a plurality of translation units (TUs) received in the one or more write messages carrying the first namespace ID. In embodiments, the first criteria set 425A enables accessing the plurality of TUs within a first format, of the one or more write messages, that depends on a data path associated with the one or more write messages. The streamer logic 430B can format the aggregated plurality of TUs into the first backend command (BCmd_1) having a second format for transmittal to the memory device via the backend 444. In embodiments, the first backend command (BCmd_1) directs the memory device in writing TU data, associated with the plurality of TUs, to the first block stripe (BS1).

Further, according to another embodiment, streamer logic 430B determines one or more write messages 435, received from a host interface (HIF), which includes a second namespace identifier (ID) associated with the second block stripe (BS2). The streamer logic 430B can access the second criteria set 425B at a second location in memory. The streamer logic 430B can aggregate a plurality of translation units (TUs) received in the one or more write messages 435. In embodiments, the second criteria set 425B enables accessing the plurality of TUs within a second format, of the one or more write messages 435, that depends on a data path associated with the one or more write messages 435 carrying the second namespace ID. The streamer logic 430B can format the aggregated plurality of TUs into the second backend command (BCmd_2) having a third format for transmittal to the memory device via the backend 444. In embodiments, the second backend command directs the memory device in writing TU data, associated with the one or more TUs, to the second block stripe (BS2).

Figure 5:
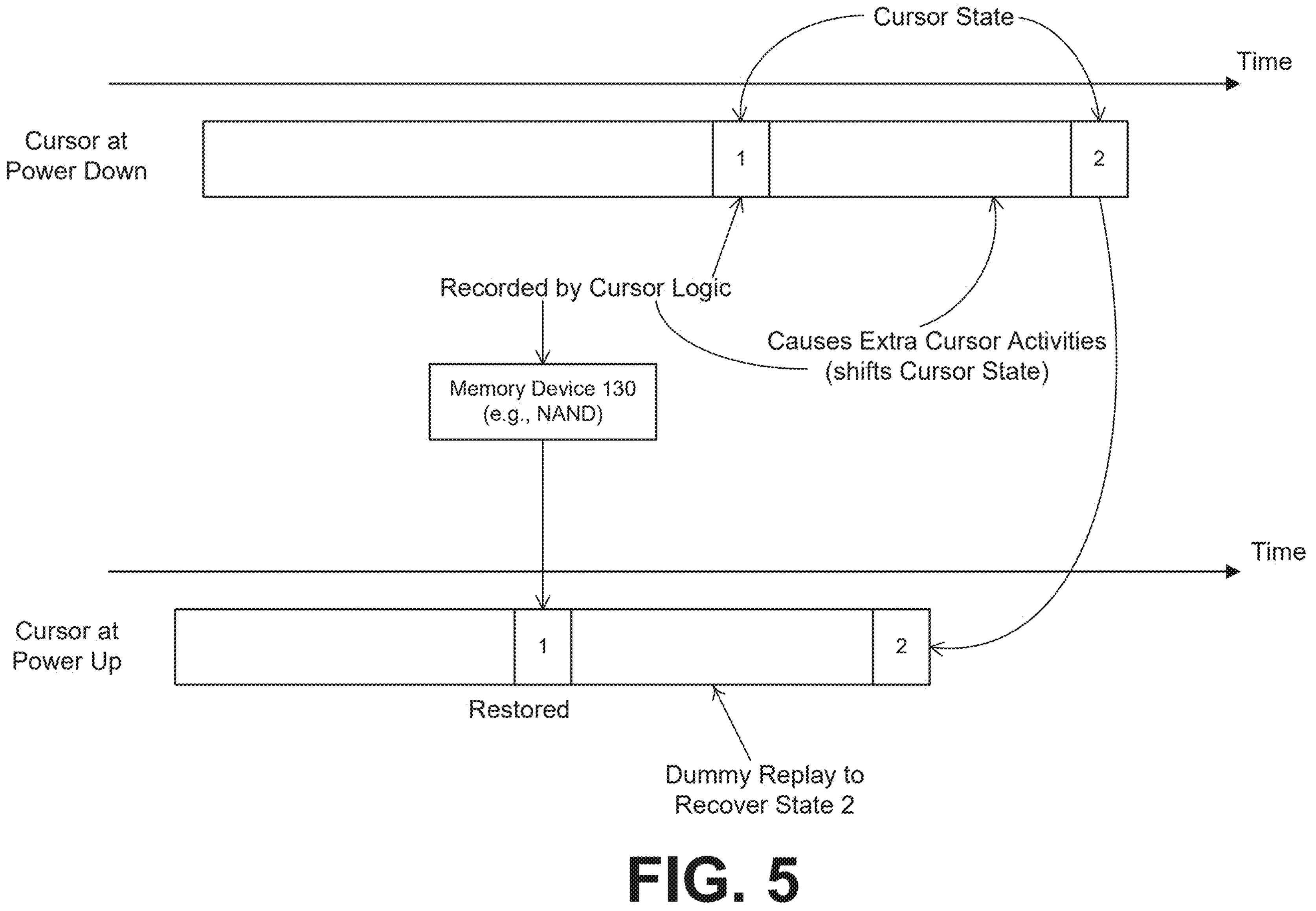
FIG. 5 is a set of timing diagrams illustrating a recorded cursor state at power down compared to a restored cursor state at power up of the memory sub-system according to some embodiments.

FIG. 5 is a set of timing diagrams illustrating a recorded cursor state at power down compared to a restored cursor state at power up of the memory sub-system according to some embodiments. In embodiments, the power down can be caused by an asynchronous power loss (APL) and clean power down (CPD) operation. Cursor modules may only persist and restore at multi-plane (MP) write boundaries so that cursor states can be flushed to non-volatile memory to be restored later. This can ensure that there are no write commands "in flight" when the power down is completed. Further, cursor state information can be stored at a MP boundary without worrying about any memory locations therebetween being impacted. The cursor state can keep moving sequentially as data is stored to the memory device 130 over time, but part of the cursor state is moving from one location to another.

In some embodiments, with continued reference to FIG. 4A, the cursor logic 414 saves a cursor state, associated with a first location in the memory array, to a data structure which is to be flushed to the memory array in response to a power down operation, e.g., one of the aforementioned APL or CPD. In embodiments, the cursor state is pushed to a second location within the memory array as a result of saving the cursor state. In the "Cursor at Power Down" portion of the timing diagrams, the first location ("1") comes before the second location ("2") in time. More specifically, because storing or recording the cursor state to the memory device 130 necessarily causes the cursor state to shift, doing so complicates recovering the actual cursor state upon power up. In embodiments, the cursor logic 414, at power down, can also output one or more pointers to memory that need to be saved for P2L buffers if there are any P2L buffers to be stored. In embodiments, pointers are saved to a source memory that need to be saved for RAIN buffers. Further, in some embodiments, the cursor logic 414 is responsible for the storage of all context data for P2L and RAIN buffers.

For a cursor to persist, data that records the internal state of the cursor logic 414 has to be saved so the cursor location can be restored to the correct state later on. If the data to be stored for the cursor location is not written using the cursor state again, this cursor state can be restored and no extra work needed. If the data to be stored for a cursor location is performed by the cursor logic 414 itself, like when FTL logic restores the cursor location to a saved state is not sufficient due to having moved locations when originally recorded. In embodiments, a post-restore cursor state adjustment is performed. The write service manager 413A can allow that adjustment by replaying the write operations (the ones happen during cursor state store operation) by using a special streamer, as will be explained in more detail.

In various embodiments, the cursor logic 414, upon power up of the memory sub-system 110, restores the cursor state from a saved cursor state data structure. As illustrated in the "Cursor at Power Up" or bottom portion of FIG. 5, the cursor state can be restored. In some embodiments, the cursor logic 414 performs one or more dummy writes, e.g., which cause the cursor state logic to think that writes have been performed although no write commands have issued. In this way, the cursor state can be moved from the first location to the second location upon power up of the memory sub-system 110, which means the cursor logic 414 can retrieve the correct cursor state from which to resume writing. In embodiments, the number of dummy writes is determined by a strict order of cursor location movement, specified by a page map, which can be impacted by known criteria such as bad planes, RAIN drops, P2L drops can all affect the cursor state. A final NAND location can be recorded by another module that does not involve the cursor logic 414. When the cursor state goes through post-persist advancement at power up, the cursor location can keep moving its write position until reaching the given location, e.g., at the second location. In this way, at power up, the cursor logic 414 has the data or information from which to determine the first location ("1") and the second location ("2"). Therefore, the cursor location can be restored to the first location and then moved to the second location. During the post-persist recovery process, the cursor logic 414 can update its internal state to match the second location.

In some embodiments, the write service manager 413A includes a second streamer logic coupled to the cursor logic 414 that is dedicated for handling advance write location, e.g., for performing dummy cursor write operations upon power up. In embodiments, the second streamer logic accepts a target flash logical address (FLA) location, e.g., which can be the first location ("1") and performs additional operations including causing, in response to powering up the processing device, a plurality of dummy writes to be performed so that the cursor logic is prompted to look for the cursor state at the second location ("2") upon restoring the cursor state as part of a power up operation. In this way, the cursor state is correctly retrieved at the true, final location that was associated with, but not stored, at power down. In embodiments, any P2L buffers can also be updated with padding entries to account for the dummy writes shifted location of the cursor state. Additionally, any RAIN context and block stripe scoreboards can be updated to account for the shifted location of the cursor state.

In some embodiments, in response to the power down operation, the cursor logic 414 at outputs one or more pointers to the memory array that are to be saved for physical-to-logical (P2L) buffers that exist and/or outputs one or more pointers to source memory that are to be saved for RAIN buffers. Further, in embodiments, in response to a power up operation, the cursor logic 414 outputs one or more pointers to the memory array that are to be populated with saved P2L buffers and/or outputs one or more pointers to the memory array that are to be populated with saved RAIN buffers.

FIG. 6 is a flow diagram of an example method 600 of synergistic interaction between cursor logic and streamer logic for backend command generation in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the write service manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the method 600 includes generating, by cursor logic of a memory sub-system controller, a criteria set associated with generating a backend command to be sent a memory device.

At operation 620, the method 600 includes accessing the criteria set by streamer logic, which is coupled to the cursor logic and to a backend that communicates with the memory device.

At operation 630, the method 600 includes aggregating, by the streamer logic, a plurality of translation units (TUs) received in one or more write messages, wherein the criteria set enables accessing the plurality of TUs within a first format, of the one or more write messages, that depends on a data path associated with the one or more write messages.

At operation 640, the method 600 includes formatting, by the streaming logic, the aggregated plurality of TUs into the backend command having a second format for transmittal to the memory device. In embodiments, the backend command directs the memory device in writing TU data, associated with the plurality of TUs, to a memory array of the memory device.

Figure 7:
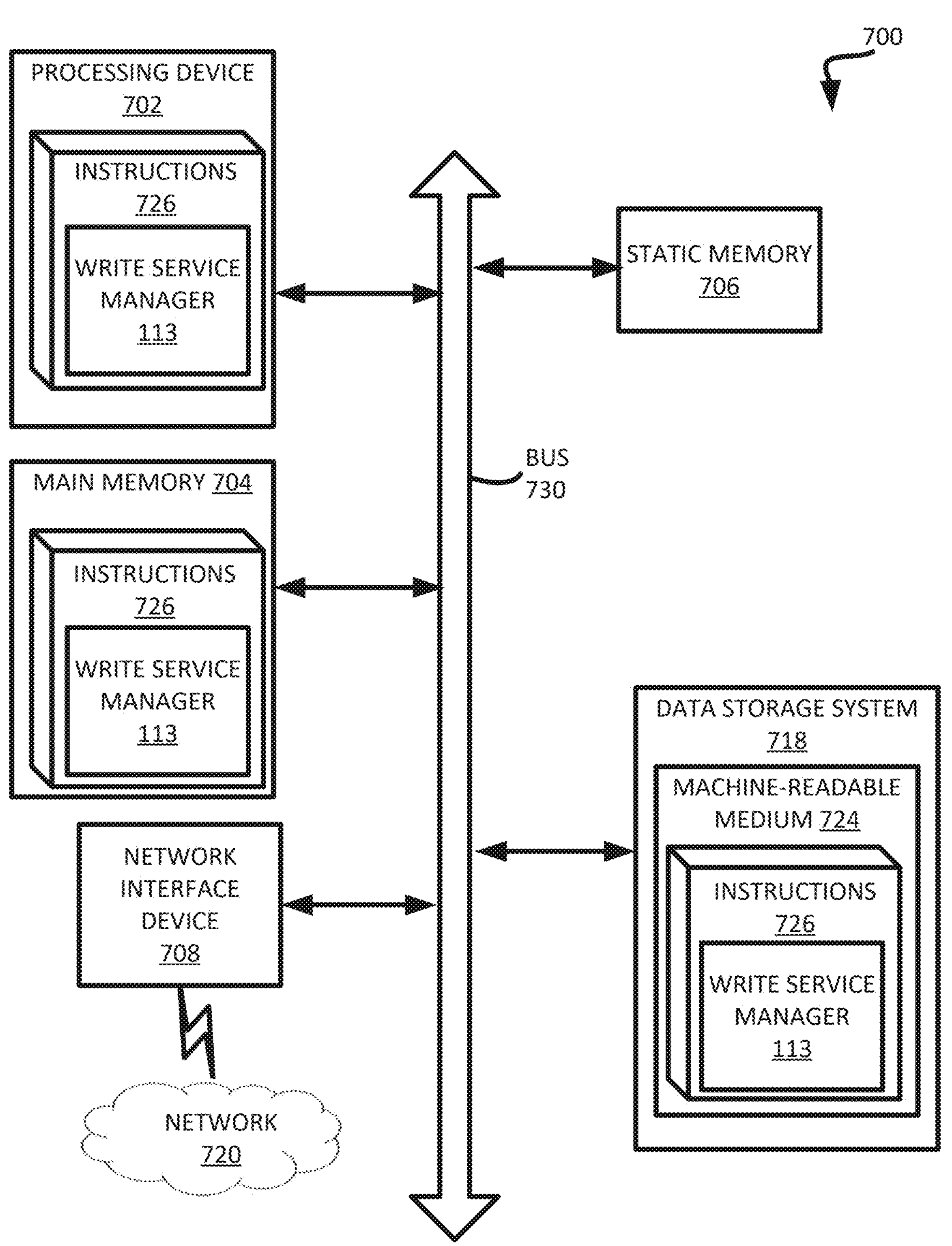
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write service manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium, such as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the write service manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A processing device comprising:

flash translation layer logic to be coupled to a memory device, wherein the flash translation layer logic comprises:

cursor logic to generate a criteria set associated with generating a backend command to be sent the memory device; and a first streamer logic component, of multiple streamer logic components, coupled between the cursor logic and a backend that interfaces with the memory device, wherein the first streamer logic component is to access and employ the criteria set to perform operations comprising:

aggregating a plurality of translation units (TUs) received in one or more write messages, wherein the criteria set enables accessing the plurality of TUs within a first format, of the one or more write messages, that depends on a first data path associated with the one or more write messages, wherein the first data path is different than a second data path associated with a second streamer logic component of the multiple streamer logic components; and formatting the aggregated plurality of TUs into the backend command having a second format for transmittal to the memory device via the backend, wherein the backend command is to direct the memory device in writing TU data, associated with the plurality of TUs, to a memory array of the memory device.

2. The processing device of claim 1, wherein the cursor logic is one of dedicated hardware or a processing core and is further to at least one of:

open and close a block stripe across a plurality of planes of the memory device;

allocate and track RAIN contexts of the memory device;

interact with a write sequencer to layout how write operations are to be ordered;

interact with a physical-to-logical (P2L) write unit to open and close P2L buffers; or handle RAIN parity writes.

3. The processing device of claim 1, wherein the cursor logic is further to:

store the criteria set in a memory; and provide, to the first streamer logic component, a pointer to the memory where the criteria set is stored.

4. The processing device of claim 1, wherein the criteria set comprises:

a location in the memory array where a write operation should be performed in response to the backend command; and how the TU data is to be organized for being written to the location.

5. The processing device of claim 1, wherein the criteria set comprises information associated with at least two of:

a size of a page group comprising the aggregated plurality of TUs;

a number of valid buffers for the page group;

physical-to-logical (P2L) translation-specific information;

a first bitmask for bad planes of the memory device;

a second bitmask for parity planes of the memory device;

RAIN-related information; and a flash logical address of the backend command.

6. The processing device of claim 1, wherein the first data path is one of a host data path, a folding write data path, a flash data manager (FDM) data path, or a post-persist physical-to-logical drop recovery data path.

7. The processing device of claim 1, wherein the operations further comprise:

interacting with a write message queue to retrieve TU data buffer addresses and TU address information in order to aggregate the plurality of TUs;

updating entries in a physical-to-logical (P2L) buffer associated with the TU address information; and transmit the backend command to the memory device.

8. The processing device of claim 1, wherein the operations further comprise at least one of:

enabling reuse of entries within a backend command buffer for subsequent writes received from a host system; and enabling reuse of a pool of pre-allocated backend commands in generating the backend command.

9. The processing device of claim 1, wherein the cursor logic is further to save a cursor state, associated with a first location in the memory array, to a data structure which is to be flushed to the memory array in response to a power down operation, wherein the cursor state is pushed to a second location within the memory array as a result of saving the cursor state.

10. The processing device of claim 9, wherein the cursor logic is further to:

in response to the power down operation, at least one of:

output one or more pointers to a source memory that are to be saved for physical-to-logical (P2L) buffers that exist; or output one or more pointers to the source memory that are to be saved for RAIN buffers; and in response to a power up operation, at least one of:

output one or more pointers to the source memory that are to be populated with saved P2L buffers; or output one or more pointers to the source memory that are to be populated with saved RAIN buffers.

11. The processing device of claim 9, further comprising the second streamer logic component coupled to the cursor logic, the second streamer logic component to perform additional operations comprising causing, in response to powering up the processing device, a plurality of dummy writes to be performed so that the cursor logic is prompted to look for the cursor state at the second location upon restoring the cursor state as part of a power up operation.

12. A system comprising:

a memory device comprising a memory array located across a plurality of planes; and a processing device coupled to the memory device, the processing device comprising flash translation layer logic, which comprises:

first cursor logic to allocate storing data to a first block stripe across the plurality of planes and generate a first criteria set associated with generating a first backend command to be sent the memory device;

second cursor logic to allocate storing data to a second block stripe across the plurality of planes and generate a second criteria set associated with generating a second backend command to be sent the memory device; and streamer logic coupled between the first and second cursor logic and a backend that interfaces with the memory device, wherein the streamer logic is to:

identify a first namespace identifier associated with first write messages to aggregate a first plurality of translation units (TUs) received in the first write messages;

identify a second namespace identifier associated with second write messages to aggregate a second plurality of TUs received in the second write messages; and switch between accessing and employing one of the first criteria set or the second criteria set to one of generate the first backend command using the aggregated first plurality of TUs or the second backend command using the aggregated second plurality of TUs, respectively, based on identifying the first write messages to be processed as being associated with the first namespace identifier and the second write messages to be processed as being associated with the second namespace identifier.

13. The system of claim 12, wherein the streamer logic is to perform operations comprising:

determining the first write messages comprise the first namespace identifier associated with the first block stripe;

accessing the first criteria set at a first location in memory;

aggregating the first plurality of TUs received in the first write messages, wherein the first criteria set enables accessing the first plurality of TUs within a first format, of the first write messages, that depends on a data path associated with the first write messages; and formatting the aggregated first plurality of TUs into the first backend command having a second format for transmittal to the memory device via the backend, wherein the first backend command is to direct the memory device in writing TU data, associated with the first plurality of TUs, to the first block stripe.

14. The system of claim 13, wherein the first criteria set comprises:

a location in the first block stripe where a write command should be performed in response to the first backend command; and how the TU data is to be organized for being written to the location.

15. The system of claim 13, wherein the first criteria set comprises information associated with at least two of:

a size of a page group comprising the aggregated plurality of TUs;

a number of valid buffers for the page group;

physical-to-logical (P2L) translation-specific information;

a first bitmask for bad planes of the memory device;

a second bitmask for parity planes of the memory device;

RAIN-related information; and a flash logical address of the backend command.

16. The system of claim 13, wherein the data path is one of a host data path, a folding write data path, a flash data manager (FDM) data path, a post-persist physical-to-logical drop recovery data path, or a unit test write data path.

17. The system of claim 13, wherein the operations further comprise:

interacting with a write message queue to retrieve TU data buffer addresses and TU address information in order to aggregate the plurality of TUs;

updating entries in a physical-to-logical (P2L) buffer associated with the TU address information; and transmit the first backend command to the memory device.

18. The system of claim 13, wherein the operations further comprise at least one of:

enabling reuse of entries within a backend command buffer for subsequent host writes received from a host system; and enabling reuse of a pool of pre-allocated backend commands in generating the first backend command.

19. The system of claim 12, wherein the streamer logic is to perform operations:

determining the second write messages comprise the second namespace identifier associated with the second block stripe;

accessing the second criteria set at a second location in memory;

aggregating the second plurality of TUs received in the second write messages, wherein the second criteria set enables accessing the plurality of TUs within a second format, of the second write messages, that depends on a data path associated with the second write messages; and formatting the aggregated second plurality of TUs into the second backend command having a second format for transmittal to the memory device via the backend, wherein the second backend command is to direct the memory device in writing TU data, associated with the aggregated second plurality of TUs, to the second block stripe.

20. A method comprising:

generating, by cursor logic of a memory sub-system controller, a criteria set associated with generating a backend command to be sent a memory device;

accessing the criteria set by a first streamer logic component, of multiple streamer logic components, which is coupled to the cursor logic and to a backend that communicates with the memory device;

aggregating, by the streamer logic, a plurality of translation units (TUs) received in one or more write messages, wherein the criteria set enables accessing the plurality of TUs within a first format, of the one or more write messages, that depends on a first data path associated with the one or more write messages, wherein the first data path is different than a second data path associated with a second streamer logic component of the multiple streamer logic components; and formatting, by the streaming logic, the aggregated plurality of TUs into the backend command having a second format for transmittal to the memory device, wherein the backend command is to direct the memory device in writing TU data, associated with the plurality of TUs, to a memory array of the memory device.

* * * * *